(12) United States Patent
Uemura et al.

(10) Patent No.: US 11,804,787 B2
(45) Date of Patent: Oct. 31, 2023

(54) POWER CONVERTING APPARATUS, MOTOR DRIVING APPARATUS, AND AIR CONDITIONER

(71) Applicant: Mitsubishi Electric Corporation, Tokyo (JP)

(72) Inventors: Keisuke Uemura, Tokyo (JP); Satoru Ichiki, Tokyo (JP); Takuya Shimomugi, Tokyo (JP); Koichi Arisawa, Tokyo (JP); Kenji Iwazaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 445 days.

(21) Appl. No.: 17/273,906

(22) PCT Filed: Sep. 28, 2018

(86) PCT No.: PCT/JP2018/036609
§ 371 (c)(1),
(2) Date: Mar. 5, 2021

(87) PCT Pub. No.: WO2020/066032
PCT Pub. Date: Apr. 2, 2020

(65) Prior Publication Data
US 2021/0242796 A1    Aug. 5, 2021

(51) Int. Cl.
*H02M 7/219*       (2006.01)
*F24F 11/88*       (2018.01)
(Continued)

(52) U.S. Cl.
CPC ............. *H02M 7/219* (2013.01); *F24F 11/88* (2018.01); *H02M 1/0009* (2021.05);
(Continued)

(58) Field of Classification Search
CPC ...... H02M 7/219; H02M 1/0009; H02P 27/08; H02P 2201/15
See application file for complete search history.

(56) References Cited

U.S. PATENT DOCUMENTS

| 2012/0155132 A1 | 6/2012 | Uno |
| 2013/0300400 A1* | 11/2013 | Zhou ................ H02M 3/1588 324/76.71 |
| 2018/0294711 A1* | 10/2018 | Yoshida ............. H02M 1/32 |

FOREIGN PATENT DOCUMENTS

| CN | 102484425 A | 5/2012 | |
| CN | 101682267 B * | 5/2013 | ......... H02M 1/4225 |

(Continued)

OTHER PUBLICATIONS

Office Action dated Apr. 28, 2023 in corresponding Chinese Patent Application No. 201880097864.6 (and partial English machine translation).

(Continued)

*Primary Examiner* — Kawing Chan
(74) *Attorney, Agent, or Firm* — POSZ LAW GROUP, PLC

(57) ABSTRACT

A power converting apparatus includes: a reactor that includes a first terminal and a second terminal, the first terminal being connected to an alternating-current power supply; a bridge circuit that is connected to the second terminal of the reactor, includes at least one or more switching elements, and converts an alternating-current voltage output from the alternating-current power supply into a direct-current voltage; a power-supply current detecting unit that detects a current from the alternating-current power supply; and a control unit that controls ON and OFF of the switching elements depending on a current value detected by the power-supply current detecting unit, in which two or (Continued)

more current thresholds for controlling ON and OFF of the switching elements are included.

6 Claims, 8 Drawing Sheets

(51) Int. Cl.
  *H02M 1/00* (2006.01)
  *H02P 27/08* (2006.01)
(52) U.S. Cl.
  CPC .......... *H02M 1/0054* (2021.05); *H02P 27/08* (2013.01); *H02P 2201/15* (2013.01)

(56) References Cited

FOREIGN PATENT DOCUMENTS

| JP | 2018-007326 A | | 1/2018 | |
|---|---|---|---|---|
| TW | 201513549 A | * | 4/2015 | .............. H02M 1/32 |
| WO | 2018/073875 A1 | | 4/2018 | |

OTHER PUBLICATIONS

International Search Report of the International Searching Authority dated Nov. 13, 2018 for the corresponding International application No. PCT/JP2018/036609 (and English translation).

\* cited by examiner

POWER CONVERTING APPARATUS, MOTOR DRIVING APPARATUS, AND AIR CONDITIONER

CROSS REFERENCE TO RELATED APPLICATION

This application is a U.S. national stage application of International Patent Application No. PCT/JP2018/036609 filed on Sep. 28, 2018, the disclosure of which is incorporated herein by reference.

TECHNICAL FIELD

The present invention relates to a power converting apparatus that converts an alternating-current power into a direct-current power, a motor driving apparatus, and an air conditioner.

BACKGROUND

Power converting apparatuses that convert a supplied alternating-current power into a direct-current power by using a bridge circuit constituted by diodes and output the direct-current power have been present. Recently, power converting apparatuses that include switching elements connected in parallel with diodes are used. Such a power converting apparatus that includes switching elements is capable of performing a voltage raising operation of raising the voltage of the alternating-current power and a synchronous rectification operation of rectifying the alternating-current power by turning the switching elements ON and OFF.

Patent Literature 1 discloses a technology for a power converting apparatus to control four switching elements depending on the voltage of an alternating-current power supplied from an alternating-current power supply and the current flowing in the alternating-current power supply, in which two of the switching elements are controlled depending on the polarity of the voltage and the other two of the switching elements are controlled depending on the polarity of the current. In controlling the two other two switching elements depending on the polarity of the current, the power converting apparatus described in Patent Literature 1 turns ON one switching element and turns OFF the other switching element when the absolute value of a current value exceeds a determination value on the positive side, and turns OFF the one switching element and turns ON the other switching element when the absolute value of a current value exceeds a determination value on the negative side.

PATENT LITERATURE

Patent Literature 1: Japanese Patent Application Laid-open No. 2018-7326

Typically, losses of switching elements and diodes vary with the amounts of current flowing therethrough. In the case of a diode, the loss is large when the current value is small, but the rate of change in the loss is improved when the current value becomes larger than a certain value. In contrast, in the case of using a switching element including a metal oxide semiconductor field effect transistor (MOSFET), the loss increases along a quadratic curve relative to the current value.

In the power converting apparatus described in Patent Literature 1, when a switching element is ON, current continues to flow through the switching element. The power converting apparatus described in Patent Literature 1 has a problem in that, although the loss can be reduced by causing current to flow through the switching element while the current value is small, the flow of current through the switching element increases the loss and lowers the efficiency when the current value becomes large.

SUMMARY

The present invention has been made in view of the above, and an object thereof is to provide a power converting apparatus capable of reducing or preventing a decrease in efficiency.

A power converting apparatus according to an aspect of the present invention includes: a reactor including a first terminal and a second terminal, the first terminal being connected to an alternating-current power supply; a bridge circuit connected to the second terminal of the reactor and including at least one or more switching elements, the bridge circuit converting an alternating-current voltage output from the alternating-current power supply into a direct-current voltage; a current detecting unit detecting a current from the alternating-current power supply; and a control unit controlling ON and OFF of the switching elements depending on a current value detected by the current detecting unit, wherein the power converting apparatus includes two or more current thresholds for controlling ON and OFF of the switching elements.

Advantageous Effects of Invention

A power converting apparatus according to the present invention produces an effect of reducing or preventing a decrease in efficiency.

DESCRIPTION OF EMBODIMENTS

A power converting apparatus, a motor driving apparatus, and an air conditioner according to embodiments of the present invention will be described in detail below with reference to the drawings. Note that the present invention is not limited to the embodiments.

First Embodiment

Figure 1:
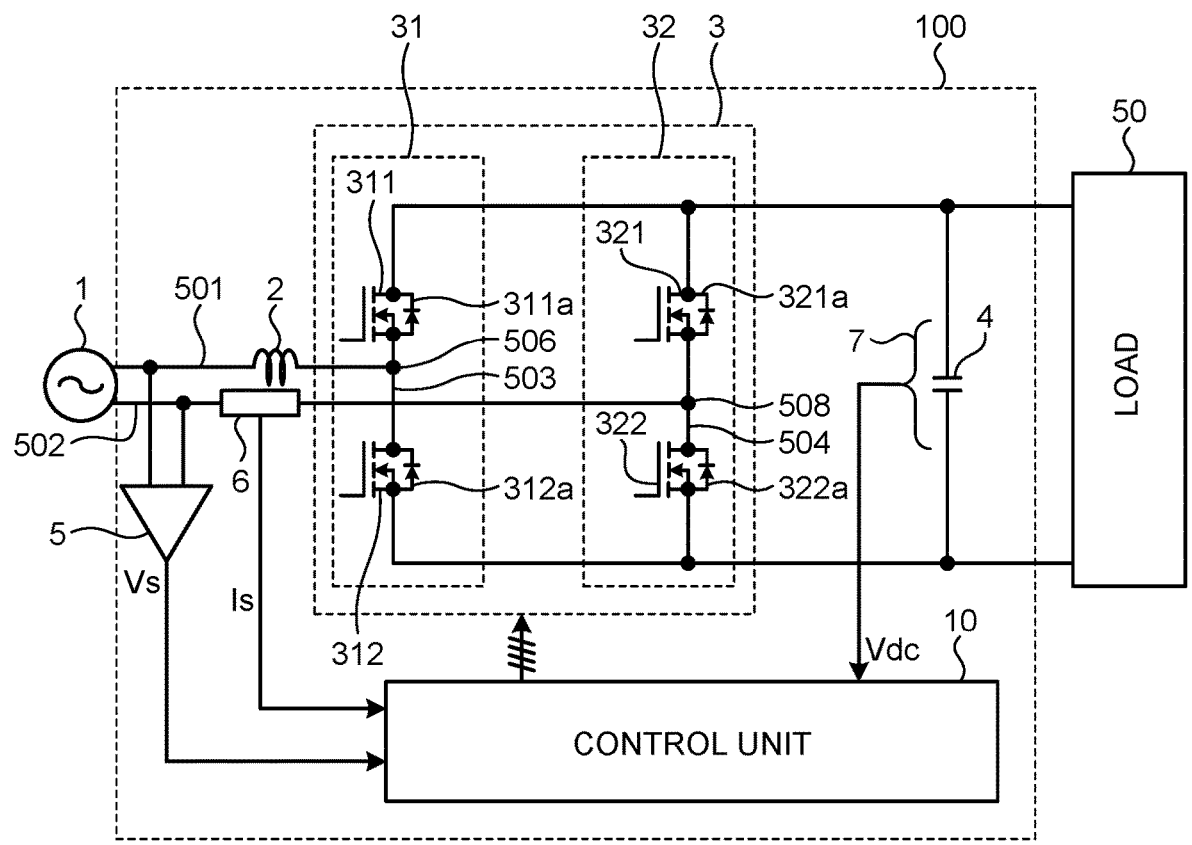
FIG. 1 is a diagram illustrating an example of a configuration of a power converting apparatus according to a first embodiment.

FIG. 1 is a diagram illustrating an example of a configuration of a power converting apparatus 100 according to a first embodiment of the present invention. The power converting apparatus 100 is a power supply device having an AC-DC converting function for converting an alternating-current power supplied from an alternating-current power supply 1 into a direct-current power and applying the direct-current power to a load 50 by using a bridge circuit 3. As illustrated in FIG. 1, the power converting apparatus 100 includes a reactor 2, the bridge circuit 3, a smoothing capacitor 4, a power-supply voltage detecting unit 5, a power-supply current detecting unit 6, a bus voltage detecting unit 7, and a control unit 10. The reactor 2 includes a first terminal and a second terminal, and the first terminal is connected to the alternating-current power supply 1.

The bridge circuit 3 is a circuit including two arms connected in parallel with each other. Each of the arms includes two switching elements connected in series with each other, and each of the switching elements is connected in parallel with a diode. Specifically, the bridge circuit 3 includes a first arm 31, which is a first circuit, and a second arm 32, which is a second circuit. The first arm 31 includes a switching element 311 and a switching element 312, which are connected in series. A parasitic diode 311a is formed in the switching element 311. The parasitic diode 311a is connected in parallel between a drain and a source of the switching element 311. A parasitic diode 312a is formed in the switching element 312. The parasitic diode 312a is connected in parallel between a drain and a source of the switching element 312. Each of the parasitic diodes 311a and 312a is a diode used as a freewheeling diode.

The second arm 32 incudes a switching element 321 and a switching element 322, which are connected in series. The second arm 32 is connected in parallel with the first arm 31. A parasitic diode 321a is formed in the switching element 321. The parasitic diode 321a is connected in parallel between a drain and a source of the switching element 321. A parasitic diode 322a is formed in the switching element 322. The parasitic diode 322a is connected in parallel between a drain and a source of the switching element 322. Each of the parasitic diodes 321a and 322a is a diode used as a freewheeling diode.

Specifically, the power converting apparatus 100 incudes a first line 501 and a second line 502, which are each connected to the alternating-current power supply 1, and the reactor 2 disposed on the first line 501. In addition, the first arm 31 includes the switching element 311 which is a first switching element, the switching element 312 which is a second switching element, and a third line 503 having a first connection point 506. The switching element 311 is connected in series to the switching element 312 by the third line 503. The first line 501 is connected to the first connection point 506. The first connection point 506 is connected to the alternating-current power supply 1 via the first line 501 and the reactor 2. The first connection point 506 is connected with the second terminal of the reactor 2.

The second arm 32 includes the switching element 321 which is a third switching element, the switching element 322 which is a fourth switching element, and a fourth line 504 having a second connection point 508, in which the switching element 321 is connected in series to the switching element 322 by the fourth line 504. The second line 502 is connected to the second connection point 508. The second connection point 508 is connected to the alternating-current power supply 1 via the second line 502. Note that the bridge circuit 3 may have any configuration that includes at least one or more switching elements and converts an alternating-current voltage output from the alternating-current power supply 1 into a direct-current voltage.

The smoothing capacitor 4 is a capacitor connected in parallel with the bridge circuit 3, or more specifically, with the second arm 32. In the bridge circuit 3, one terminal of the switching element 311 is connected to the positive side of the smoothing capacitor 4, the other terminal of the switching element 311 is connected to one terminal of the switching element 312, and the other terminal of the switching element 312 is connected to the other terminal of the smoothing capacitor 4.

The switching elements 311, 312, 321, and 322 are constituted by MOSFETs. For the switching elements 311, 312, 321, and 322, MOSFETs made of wide band gap (WBG) semiconductors such as gallium nitride (GaN), silicon carbide (SiC), diamond, or aluminum nitride can be used. Use of the WBG semiconductors for the switching elements 311, 312, 321, and 322 increases the withstand voltage characteristics and also increases the allowable current density, thereby allows miniaturization of modules. Because the WBG semiconductors also have high heat resistance, radiating fins in a radiating unit can also be miniaturized.

The control unit 10 generates driving pulses for causing the switching elements 311, 312, 321, and 322 of the bridge circuit 3 to operate on the basis of signals output from each of the power-supply voltage detecting unit 5, the power-supply current detecting unit 6, and the bus voltage detecting unit 7. The power-supply voltage detecting unit 5 is a voltage detecting unit that detects a power-supply voltage Vs, which is a voltage value of a voltage output from the alternating-current power supply 1, and outputs an electrical signal indicating the detection result to the control unit 10. The power-supply current detecting unit 6 is a current detecting unit that detects a power-supply current Is, which is a current value of a current output from the alternating-current power supply 1, and outputs an electrical signal indicating the detection result to the control unit 10. The power-supply current Is is a current value of a current flowing between the alternating-current power supply 1 and the bridge circuit 3. The bus voltage detecting unit 7 is a voltage detecting unit that detects a bus voltage Vdc, and outputs an electrical signal indicating the detection result to the control unit 10. The bus voltage Vdc is a voltage obtained by smoothing a voltage output from the bridge circuit 3 by the smoothing capacitor 4. The control unit 10 controls ON and OFF of the switching elements 311, 312, 321, and 322 depending on the power-supply voltage Vs, the power-supply current Is, and the bus voltage Vdc. Note that the control unit 10 may control ON and OFF of the switching elements 311, 312, 321, and 322 by using at least one of the power-supply voltage Vs, the power-supply current Is, and the bus voltage Vdc.

Next, basic operation of the power converting apparatus 100 according to the first embodiment will be described. Hereinafter, the switching elements 311 and 321 connected to the positive side of the alternating-current power supply 1, that is, a positive terminal of the alternating-current power supply 1 may also be referred to as upper switching elements. In addition, the switching elements 312 and 322 connected to the negative side of the alternating-current power supply 1, that is, a negative terminal of the alternating-current power supply 1 may also be referred to as lower switching elements.

In the first arm 31, the upper switching element and the lower switching element operate complementarily. Specifically, when one of the upper switching element and the lower switching element is ON, the other is OFF. As will be described later, the switching elements 311 and 312 constituting the first arm 31 are driven by pulse width modulation (PWM) signals that are driving signals generated by the control unit 10. The operations of turning the switching elements 311 and 312 ON or OFF in accordance with the PWM signals will hereinafter also be referred to as switching operations. In order to prevent a short circuit of the smoothing capacitor 4 via the alternating-current power supply 1 and the reactor 2, the switching element 311 and the switching element 312 are both OFF when the absolute value of the power-supply current Is output from the alternating-current power supply 1 is equal to or smaller than a first current threshold. Hereinafter, the short circuit of the smoothing capacitor 4 will be referred to as a capacitor short circuit. The capacitor short circuit is a state in which the energy stored in the smoothing capacitor 4 is released and the current is regenerated back to the alternating-current power supply 1.

The switching elements 321 and 322 constituting the second arm 32 are turned ON or OFF by driving signals generated by the control unit 10. Basically, the switching elements 321 and 322 are turned ON or OFF depending on a power-supply voltage polarity that is the polarity of a voltage output from the alternating-current power supply 1. Specifically, when the power-supply voltage polarity is positive, the switching element 322 is ON and the switching element 321 is OFF, and when the power-supply voltage polarity is negative, the switching element 321 is ON and the switching element 322 is OFF. Note that, in FIG. 1, an arrow extending from the control unit 10 toward the bridge circuit 3 represents driving signals for controlling ON and OFF of the switching elements 321 and 322, and the aforementioned PWM signals for controlling ON and OFF of the switching elements 311 and 312.

Next, the relation between the states of the switching elements in the first embodiment and the path of current flowing in the power converting apparatus 100 according to the first embodiment will be explained. Note that the structure of the MOSFETs will be described with reference to FIG. 2 before the explanation.

Figure 2:
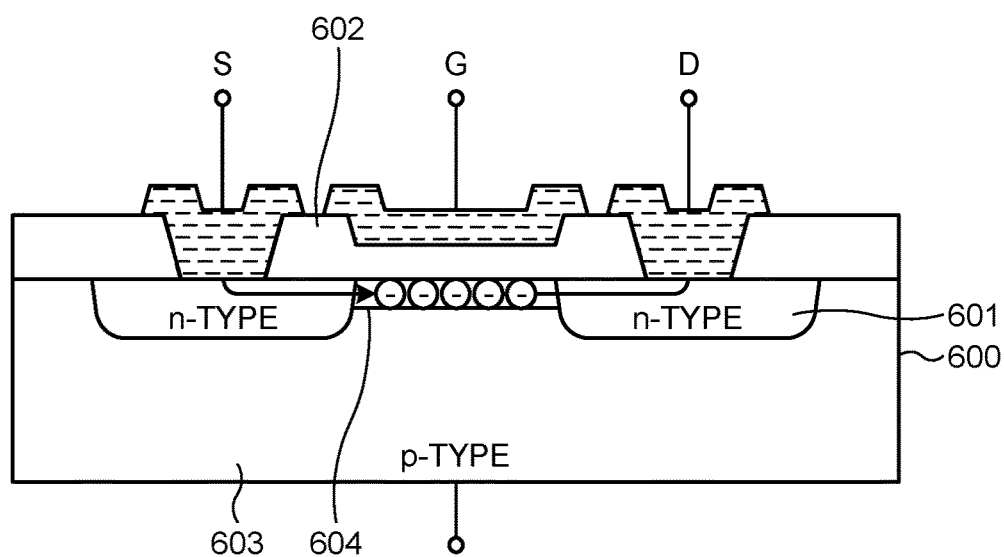
FIG. 2 is a schematic cross-sectional view illustrating an outline structure of a MOSFET.

FIG. 2 is a schematic cross-sectional view illustrating an outline structure of a MOSFET. FIG. 2 illustrates an example of an n-type MOSFET. In an n-type MOSFET, a p-type semiconductor substrate 600 is used as illustrated in FIG. 2. A source electrode S, a drain electrode D, and a gate electrode G are formed on the semiconductor substrate 600. High-concentration impurity is introduced by ion implantation into portions in contact with the source electrode S and the drain electrode D to form n-type regions 601. In addition, an insulating oxide layer 602 is formed between a portion of the semiconductor substrate 600 where no n-type region 601 is formed and the gate electrode G. Thus, the insulating oxide layer 602 is present between the gate electrode G and a p-type region 603 of the semiconductor substrate 600.

When a positive voltage is applied to the gate electrode G, electrons are attracted to an interface between the p-type region 603 and the insulating oxide layer 602 of the semiconductor substrate 600, and the interface is negatively charged. The electron density of a portion where electrons have gathered becomes higher than a hole density, and the portion becomes n-type. The portion that has become n-type becomes a current path, and will be referred to as a channel 604. The channel 604 is an n-type channel in the example of FIG. 2. When the MOSFET is controlled to be ON, more current flows to the channel 604 than to a parasitic diode formed in the p-type region 603.

Figure 3:
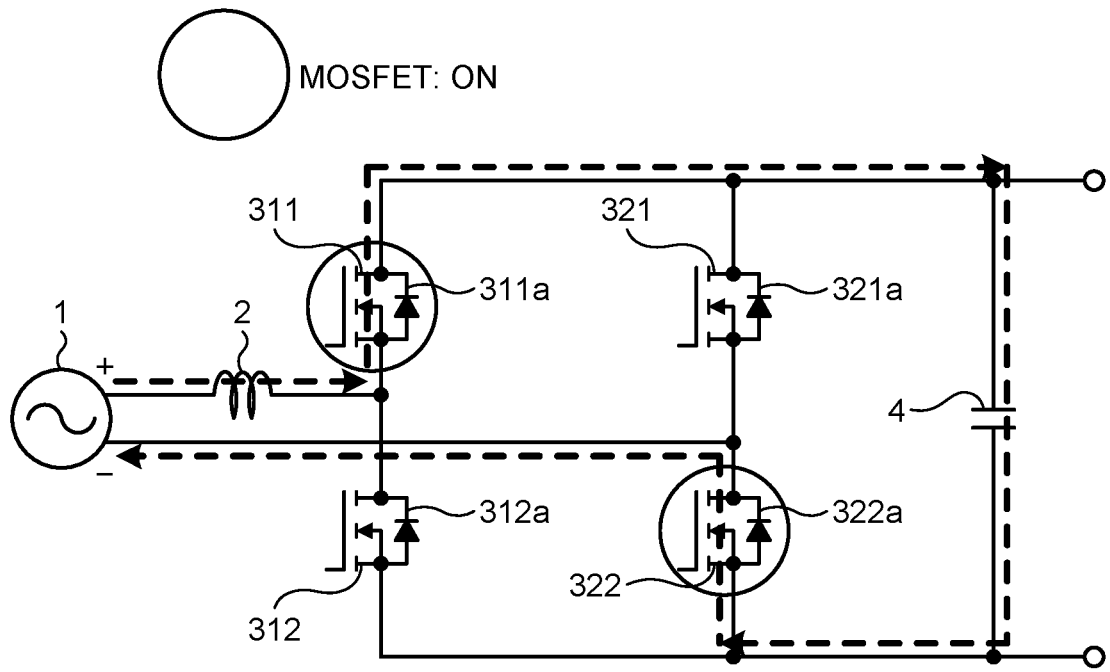
FIG. 3 is a first diagram illustrating a path of current flowing in the power converting apparatus according to the first embodiment when the absolute value of a power-supply current is larger than a current threshold and a power-supply voltage polarity is positive.

FIG. 3 is a first diagram illustrating a path of current flowing in the power converting apparatus 100 according to the first embodiment when the absolute value of the power-supply current Is is larger than the current threshold and the power-supply voltage polarity is positive. In FIG. 3, the power-supply voltage polarity is positive, the switching element 311 and the switching element 322 are ON, and the switching element 312 and the switching element 321 are OFF. In this state, current flows in the order of the alternating-current power supply 1, the reactor 2, the switching element 311, the smoothing capacitor 4, the switching element 322, and the alternating-current power supply 1. Thus, in the first embodiment, a synchronous rectification operation is performed in such a manner that current flows through each of the channels of the switching element 311 and the switching element 322 instead of flowing through the parasitic diode 311a and the parasitic diode 322a. Note that, in FIG. 3, the switching elements that are ON are indicated by circles. The same applies to subsequent drawings.

Figure 4:
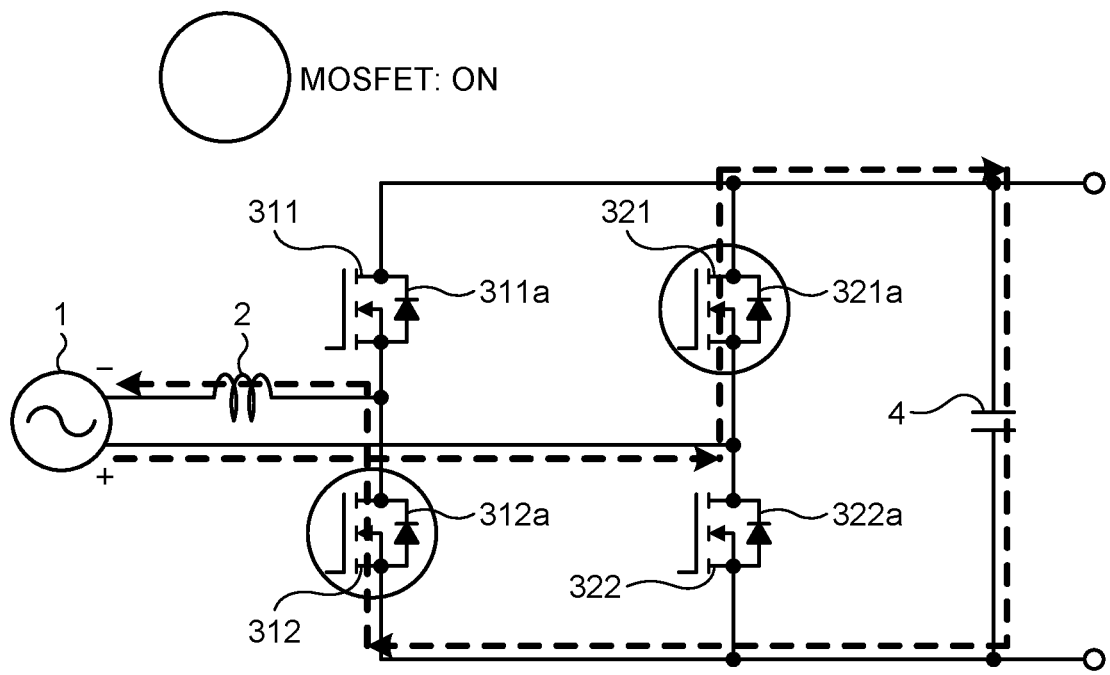
FIG. 4 is a first diagram illustrating a path of current flowing in the power converting apparatus according to the first embodiment when the absolute value of the power-supply current is larger than the current threshold and the power-supply voltage polarity is negative.

FIG. 4 is a first diagram illustrating a path of current flowing in the power converting apparatus 100 according to the first embodiment when the absolute value of the power-supply current Is is larger than the current threshold and the power-supply voltage polarity is negative. In FIG. 4, the power-supply voltage polarity is negative, the switching element 312 and the switching element 321 are ON, and the switching element 311 and the switching element 322 are OFF. In this state, current flows in the order of the alternating-current power supply 1, the switching element 321, the smoothing capacitor 4, the switching element 312, the reactor 2, and the alternating-current power supply 1. Thus, in the first embodiment, a synchronous rectification operation is performed in such a manner that current flows through each of the channels of the switching element 321 and the switching element 312 instead of flowing through the parasitic diode 321a and the parasitic diode 312a.

Figure 5:
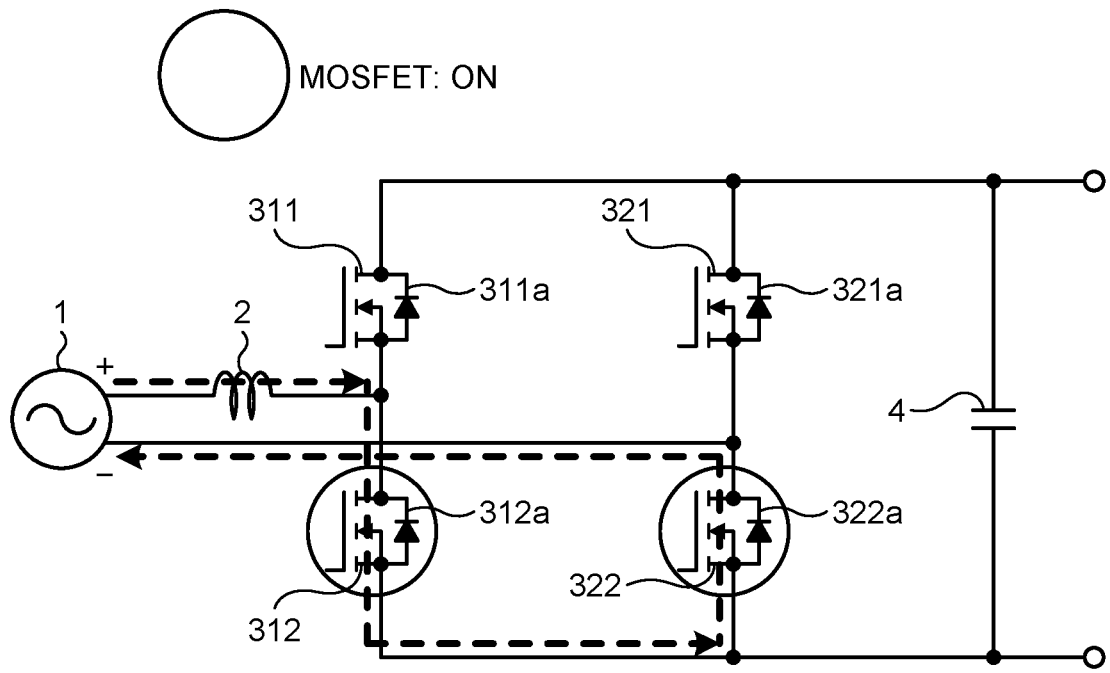
FIG. 5 is a second diagram illustrating a path of current flowing in the power converting apparatus according to the first embodiment when the absolute value of the power-supply current is larger than the current threshold and the power-supply voltage polarity is positive.

FIG. 5 is a second diagram illustrating a path of current flowing in the power converting apparatus 100 according to the first embodiment when the absolute value of the power-supply current Is is larger than the current threshold and the power-supply voltage polarity is positive. In FIG. 5, the power-supply voltage polarity is positive, the switching element 312 and the switching element 322 are ON, and the switching element 311 and the switching element 321 are OFF. In this state, current flows in the order of the alternating-current power supply 1, the reactor 2, the switching element 312, the switching element 322, and the alternating-current power supply 1, and a power supply short-circuit path that does not pass through the smoothing capacitor 4 is thus formed. Thus, in the first embodiment, the power supply short-circuit path is formed in such a manner that current flows through each of the channels of the switching element 312 and the switching element 322 instead of flowing through the parasitic diode 312a and the parasitic diode 322a.

Figure 6:
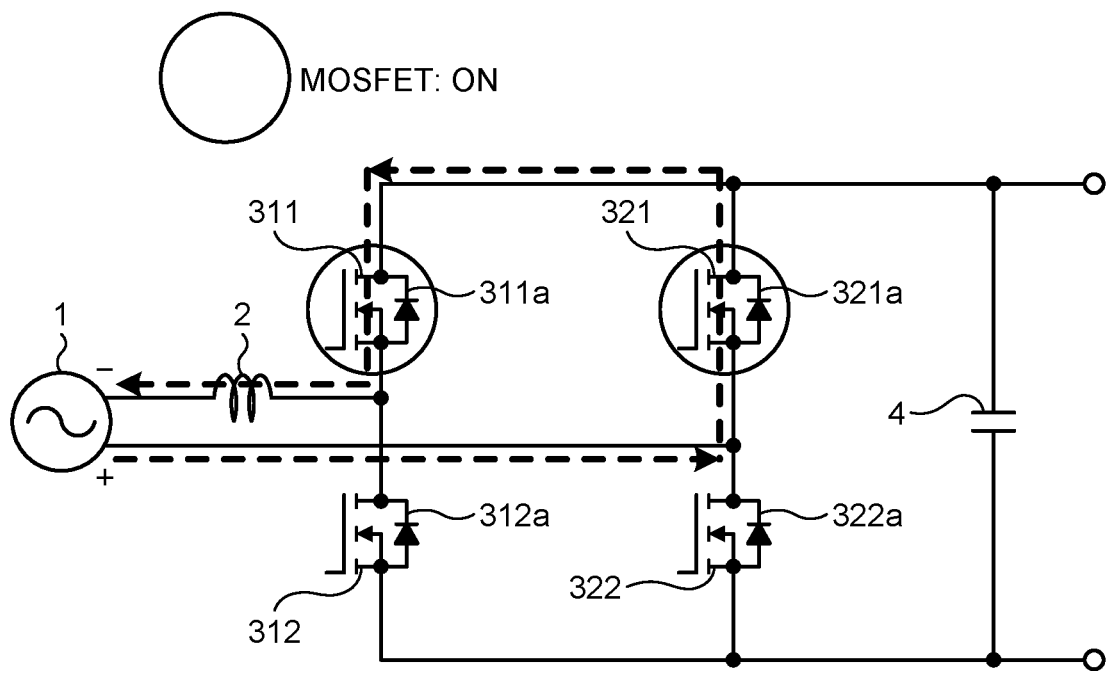
FIG. 6 is a second diagram illustrating a path of current flowing in the power converting apparatus according to the first embodiment when the absolute value of the power-supply current is larger than the current threshold and the power-supply voltage polarity is negative.

FIG. 6 is a second diagram illustrating a path of current flowing in the power converting apparatus 100 according to the first embodiment when the absolute value of the power-supply current Is is larger than the current threshold and the power-supply voltage polarity is negative. In FIG. 6, the power-supply voltage polarity is negative, the switching element 311 and the switching element 321 are ON, and the switching element 312 and the switching element 322 are OFF. In this state, current flows in the order of the alternating-current power supply 1, the switching element 321, the switching element 311, the reactor 2, and the alternating-current power supply 1, and a power supply short-circuit path that does not pass through the smoothing capacitor 4 is formed. Thus, in the first embodiment, the power supply short-circuit path is formed in such a manner that current flows through each of the channels of the switching element 311 and the switching element 321 instead of flowing through the parasitic diode 311a and the parasitic diode 321a.

The control unit 10 can control the values of the power-supply current Is and the bus voltage Vdc by controlling switching among the current paths described above. The power converting apparatus 100 performs operations such as increase of the bus voltage Vdc and synchronous rectification of the power-supply current Is, by continuously switching between a load power supply mode illustrated in FIG. 3 and a power supply short-circuit mode illustrated in FIG. 5 when the power-supply voltage polarity is positive, and continuously switching between a load power supply mode illustrated in FIG. 4 and a power supply short-circuit mode illustrated in FIG. 6 when the power-supply voltage polarity is negative. Specifically, the control unit 10 controls ON and OFF of the switching elements 311, 312, 321, and 322 with a switching frequency of the switching elements 311 and 312, which perform switching operations by the PWM, being higher than a switching frequency of the switching elements 321 and 322, which perform switching operations depending on the polarity of the power-supply voltage Vs. In the description below, the switching elements 311, 312, 321, and 322 may simply be referred to as switching elements when the switching elements 311, 312, 321, and 322 are not distinguished from one another. Similarly, the parasitic diodes 311a, 312a, 321a, and 322a may simply be referred to as parasitic diodes when the parasitic diodes 311a, 312a, 321a, and 322a are not distinguished from one another.

Figure 7:
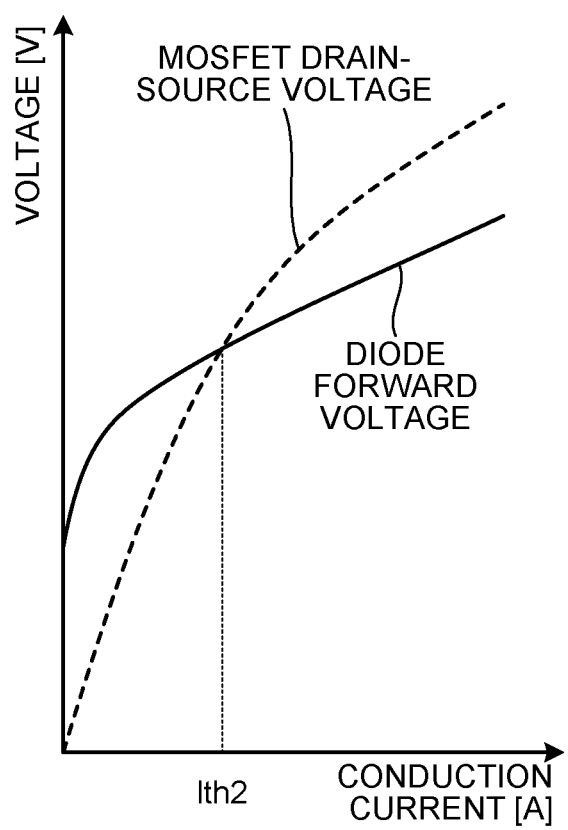
FIG. 7 is a graph illustrating current-voltage characteristics with losses occurring in a switching element and a parasitic diode used in the power converting apparatus according to the first embodiment.

Next, the loss characteristics of the switching elements and the parasitic diodes used in the power converting apparatus 100 will be explained. FIG. 7 is a graph illustrating current-voltage characteristics with losses occurring in a switching element and a parasitic diode used in the power converting apparatus 100 according to the first embodiment. In FIG. 7, the horizontal axis represents a current flowing through the switching element in the ON state, and a current flowing through the parasitic diode. In FIG. 7, the vertical axis represents a voltage necessary for a current to flow through the switching element in the ON state, and a voltage necessary for a current to flow through the parasitic diode. In FIG. 7, the current-voltage characteristics with a loss occurring in the switching element are indicated by a MOSFET drain-source voltage, and the current-voltage characteristics with a loss occurring in the parasitic diode are indicated by a diode forward voltage.

In FIG. 7, the solid line depicts the current-voltage characteristics of the parasitic diode. The current-voltage characteristics of the parasitic diode indicate the relation between the current flowing through the parasitic diode and the voltage necessary for the current to flow depending on the loss caused by the ON-resistance of the parasitic diode when the current flows. Typically, in the case of a diode, the loss is large and a high voltage is thus necessary when the current value is small, but the rate of change in the loss is improved and the slope of the current-voltage characteristics becomes moderate when the current value becomes larger than a certain value. In FIG. 7, the dotted line depicts the loss characteristics of the switching element in the ON state. The current-voltage characteristics of the switching element indicate the relation between the current flowing to carriers in the switching element and the voltage necessary for the current to flow depending on the loss caused by the ON-resistance of the switching element when the current flows. In the case of a switching element such as a MOSFET, the voltage necessary for the current to flow increases along a quadratic curve relative to the current value.

A cross-point at which the solid line of the current-voltage characteristics of the parasitic diode and the dotted line of the current-voltage characteristics of the switching element intersect is a point at which the current flowing through the parasitic diode and the voltage necessary for the current to flow through the parasitic diode are equal to the current flowing through the switching element and the voltage necessary for the current to flow, respectively. In the present embodiment, the current value at the cross-point of the two current-voltage characteristics of the parasitic diode and the switching element will be referred to as a second current threshold. The second current threshold is a value larger than the first current threshold described above. In FIG. 7, the second current threshold is denoted by Ith2.

Figure 8:
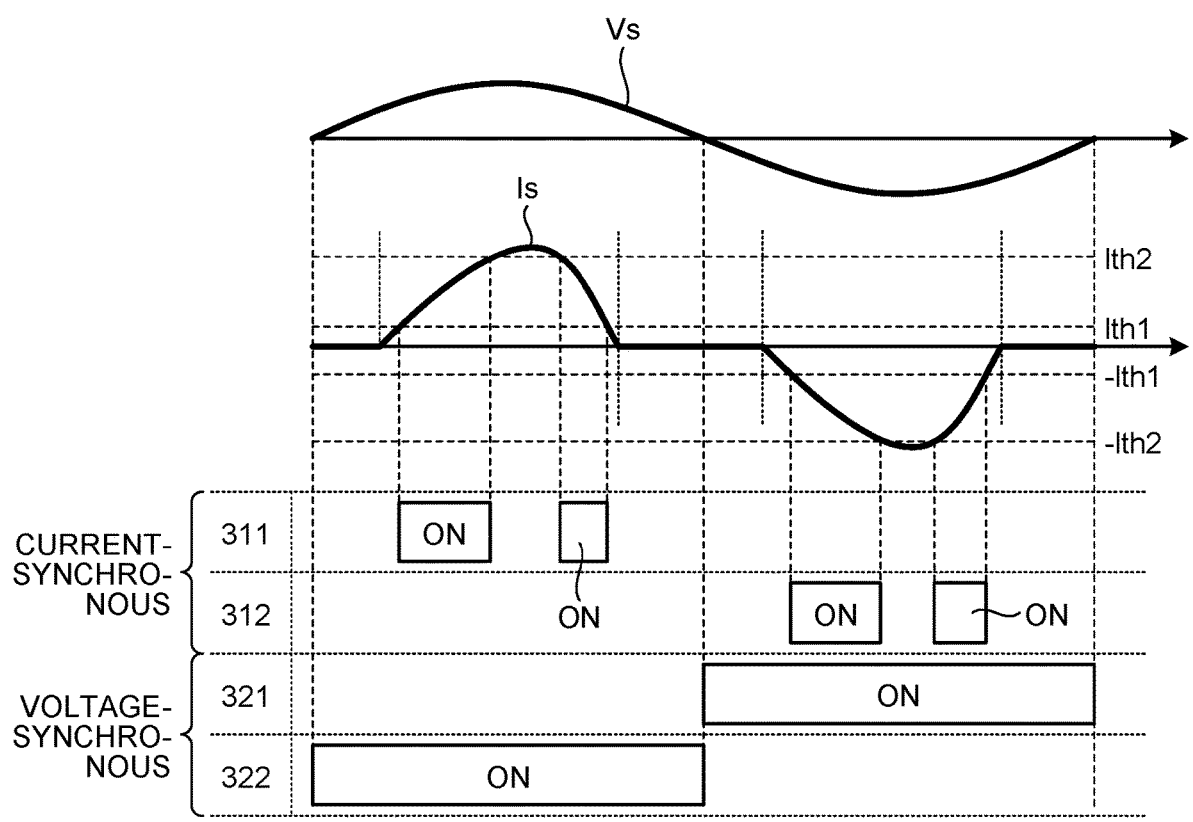
FIG. 8 is a chart illustrating the timings at which a control unit turns switching elements ON in the power converting apparatus according to the first embodiment.

The timings at which the control unit 10 turns the switching elements ON and OFF will be explained by using the first current threshold and the second current threshold. FIG. 8 is a chart illustrating the timings at which the control unit 10 turns the switching elements ON in the power converting apparatus 100 according to the first embodiment. In FIG. 8, the horizontal axis represents time. In FIG. 8, Vs represents a power-supply voltage Vs detected by the power-supply voltage detecting unit 5, and Is represents a power-supply current Is detected by the power-supply current detecting unit 6. In FIG. 8, the switching elements 311 and 312 are current-synchronous switching elements, which are controlled to be ON and OFF depending on the polarity of the power-supply current Is, and the switching elements 321 and 322 are voltage-synchronous switching elements, which are controlled to be ON and OFF depending on the polarity of the power-supply voltage Vs. In addition, in FIG. 8, Ith1 denotes the first current threshold, and Ith2 denotes the second current threshold. While one period of an alternating-current power output from the alternating-current power supply 1 is illustrated in FIG. 8, assume that the control unit 10 also performs control similar to that illustrated in FIG. 8 in other periods.

When the polarity of the power-supply voltage is positive, the control unit 10 turns the switching element 322 ON and the switching element 321 OFF. In addition, when the polarity of the power-supply voltage is negative, the control unit 10 turns the switching element 321 ON, and the switching element 322 OFF. While the timing at which the switching element 322 is switched from ON to OFF is the same as the timing at which the switching element 321 is switched from OFF to ON in FIG. 8, the timings are not limited thereto. The control unit 10 may set a dead time during which the switching elements 321 and 322 are both OFF between the timing at which the switching element 322 is switched from ON to OFF and the timing at which the switching element 321 is switched from OFF to ON. Similarly, the control unit 10 may set a dead time during which the switching elements 321 and 322 are both OFF between the timing at which the switching element 321 is switched from ON to OFF and the timing at which the switching element 322 is switched from OFF to ON.

In the case where the polarity of the power-supply voltage is positive, the control unit 10 turns the switching element 311 ON when the absolute value of the power-supply current Is has become equal to or larger than the first current threshold, and further turns the switching element 311 OFF when the absolute value of the power-supply current Is has exceeded the second current threshold. Thereafter, the control unit 10 turns the switching element 311 ON when the absolute value of the power-supply current Is has decreased and become equal to or smaller than the second current threshold, and further turns the switching element 311 OFF when the absolute value of the power-supply current Is has become smaller than the first current threshold. In addition, in the case where the polarity of the power-supply voltage is negative, the control unit 10 turns the switching element 312 ON when the absolute value of the power-supply current Is has become equal to or larger than the first current threshold, and further turns the switching element 312 OFF when the absolute value of the power-supply current Is has exceeded the second current threshold. Thereafter, the control unit 10 turns the switching element 312 ON when the absolute value of the power-supply current Is has decreased and become equal to or smaller than the second current threshold, and further turns the switching element 312 OFF when the absolute value of the power-supply current Is has become smaller than the first current threshold.

When the absolute value of the power-supply current Is is equal to or smaller than the first current threshold, the control unit 10 performs control so that the switching element 311 and the switching element 321, which are the upper switching elements, are not ON at the same time, and so that the switching element 312 and the switching element 322, which are the lower switching elements, are not ON at the same time. As a result, the control unit 10 can prevent a capacitor short circuit in the power converting apparatus 100.

Through the above-described control performed by the control unit 10, the power converting apparatus 100 can achieve synchronous rectification control by the switching elements 311 and 312 of the first arm 31. Specifically, when the absolute value of the power-supply current Is is equal to or larger than the first current threshold and equal to or smaller than the second current threshold, the control unit 10 causes a current to flow through the switching element 311 or the switching element 312, in which the loss is small within this range. In addition, when the absolute value of the power-supply current Is is larger than the second current threshold, the control unit 10 causes a current to flow through the parasitic diode 311a or the parasitic diode 312a, in which the loss is small within this range. As a result, the power converting apparatus 100 can cause a current to flow through an element with a small loss depending on the current value, which reduces or prevents decrease in efficiency, reduces the loss, and can thus achieve a highly efficient system.

Note that the control unit 10 may perform a voltage raising operation by performing a switching control of complementarity turning the switching elements 311 and 312 ON and OFF in the period during which the switching element 311 is ON. Similarly, the control unit 10 may perform a voltage raising operation by performing a switching control of complementarity turning the switching elements 311 and 312 ON and OFF in the period during which the switching element 312 is ON.

Specifically, when the absolute value of the power-supply current Is is equal to or larger than the first current threshold and equal to or smaller than the second current threshold, the control unit 10 permits one of the switching elements 311 and 312 constituting the first arm 31, which is one of the first arm 31 and the second arm 32, to be ON depending on the polarity of the power-supply current Is. In addition, when the absolute value of the power-supply current Is is smaller than the first current threshold or larger than the second current threshold, the control unit 10 inhibits the aforementioned one of the switching elements 311 and 312 from being ON.

Specifically, in the case where the polarity of the power-supply current Is is positive, the control unit 10 permits the switching element 311 to be ON when the absolute value of the power-supply current Is is equal to or larger than the first current threshold and equal to or smaller than the second current threshold, and inhibits the switching element 311 from being ON when the absolute value of the power-supply current Is is smaller than the first current threshold or larger than the second current threshold. In the case where the polarity of the power-supply current Is is positive, the control unit 10 turns the switching element 312 ON in the period during which the switching element 311 is OFF when the absolute value of the power-supply current Is is equal to or larger than the first current threshold and equal to or smaller than the second current threshold, and also inhibits the switching element 312 from being ON when the absolute value of the power-supply current Is is smaller than the first current threshold or larger than the second current threshold.

In addition, in the case where the polarity of the power-supply current Is is negative, the control unit 10 permits the switching element 312 to be ON when the absolute value of the power-supply current Is is equal to or larger than the first current threshold and equal to or smaller than the second current threshold, and inhibits the switching element 312 from being ON when the absolute value of the power-supply current Is is smaller than the first current threshold or larger than the second current threshold. In the case where the polarity of the power-supply current Is is negative, the control unit 10 turns the switching element 311 ON in the period during which the switching element 312 is OFF when the absolute value of the power-supply current Is is equal to or larger than the first current threshold and equal to or smaller than the second current threshold, and also inhibits the switching element 311 from being ON when the absolute value of the power-supply current Is is smaller than the first current threshold or larger than the second current threshold.

As described above, the control unit 10 permits a switching element to be ON in a range in which the absolute value of the power-supply current Is is equal to or larger than the first current threshold and the loss of the switching element is smaller than the loss of the parasitic diode. In addition, the control unit 10 inhibits a switching element from being ON in a range in which the loss of the switching element is larger than the loss of the parasitic diode. In the first embodiment, the control unit 10 turns ON at least one or more of the switching elements depending on the polarity of the power-supply current Is when the absolute value of the power-supply current Is is equal to or larger than the first current threshold and equal to or smaller than the second current threshold, and turns OFF at least one or more of the switching elements when the absolute value of the power-supply current Is is smaller than the first current threshold or larger than the second current threshold.

Figure 9:
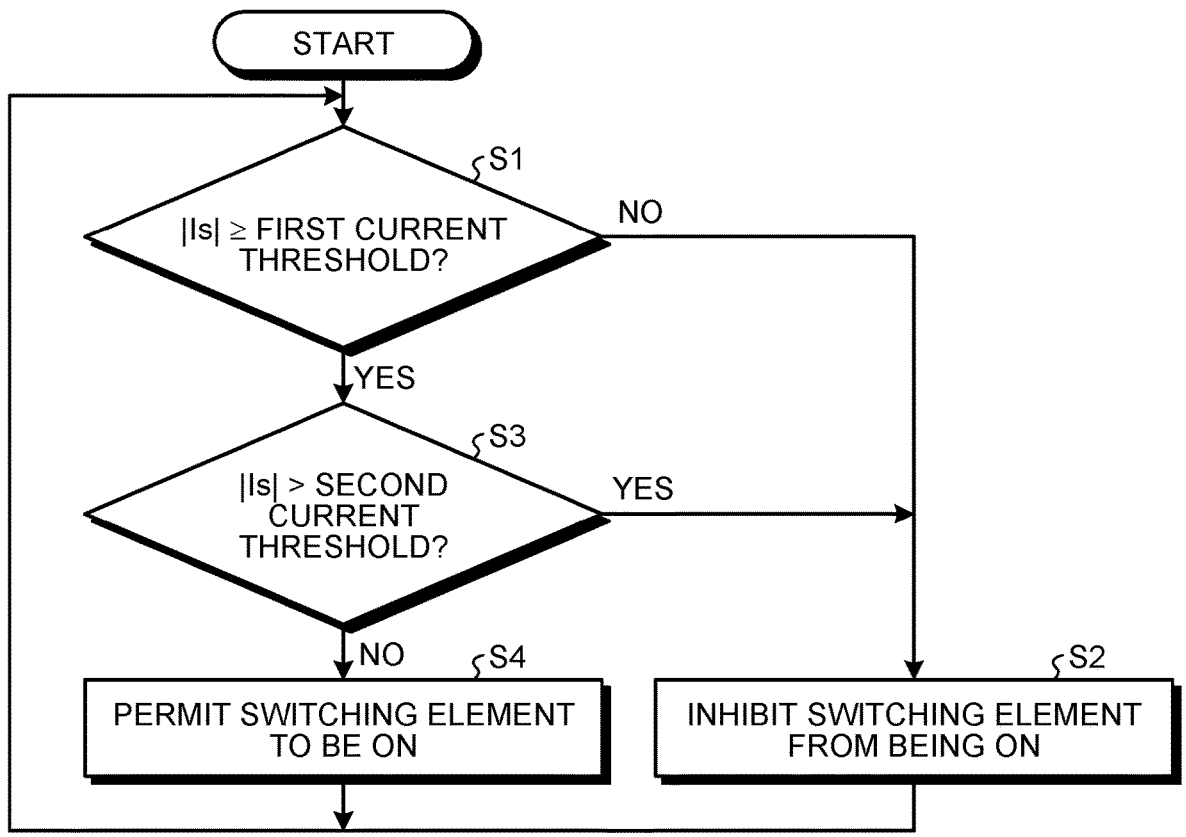
FIG. 9 is a flowchart illustrating processes of performing ON/OFF control on switching elements by the control unit of the power converting apparatus according to the first embodiment.

FIG. 9 is a flowchart illustrating processes of performing ON/OFF control on the switching elements 311 and 312 by the control unit 10 of the power converting apparatus 100 according to the first embodiment. The case where the polarity of the power-supply current Is is positive will be described as one example. The control unit 10 compares the absolute value of the power-supply current Is with the first current threshold (step S1). If the absolute value of the power-supply current Is is smaller than the first current threshold (step S1: No), the control unit 10 inhibits the switching element 311 from being ON (step S2). If the absolute value of the power-supply current Is is equal to or larger than the first current threshold (step S1: Yes), the control unit 10 compares the absolute value of the power-supply current Is with the second current threshold (step S3). If the absolute value of the power-supply current Is is equal to or smaller than the second current threshold (step S3: No), the control unit 10 permits the switching element 311 to be ON (step S4). If the absolute value of the power-supply current Is is larger than the second current threshold (step S3: Yes), the control unit 10 inhibits the switching element 311 from being ON (step S2). After step S2 or step S4, the control unit 10 returns to step S1 and repeats the processes described above. In the case where the polarity of the power-supply current Is is negative, the control unit 10 performs the processes similar to the above on the switching element 312.

A configuration of a switching element will now be described. One of methods for increasing the switching speed of a switching element in the power converting apparatus 100 is a method of lowering the gate resistance of the switching element. As the gate resistance is smaller, the time for charging and discharging a gate input capacity is shorter, the turn-on period and the turn-off period are shorter, and the switching speed thus increases.

There is, however, a limit in reducing switching loss by lowering the gate resistance. Thus, the switching element is formed of a WBG semiconductor such as GaN or SiC, which can further reduce a loss per one switching, further improves the efficiency, and enables high-frequency switching. In addition, when high-frequency switching is enabled, the reactor 2 can be reduced in size, and the power converting apparatus 100 can be reduced in size and weight. In addition, when a WBG semiconductor is used for the switching element, the switching speed increases, and the switching loss is reduced, which can simplify heat radiation measures allowing the switching element to continue normal operations. In addition, when a WBG semiconductor is used for the switching element, the switching frequency can be a sufficiently high value, such as 16 kHz or higher, for example, and sound noise caused by switching can thus be reduced.

Furthermore, in a GaN semiconductor, two-dimensional electron gas is generated at an interface of a GaN layer and an aluminum-gallium-nitride layer, and the two-dimensional electron gas makes carrier mobility high. Thus, a switching element using the GaN semiconductor is capable of achieving high-speed switching. Note that, in a case where the alternating-current power supply 1 is a commercial power supply of 50 Hz or 60 Hz, the audible frequency is in a range from 16 kHz to 20 kHz, that is, a range from 266 to 400 times the frequency of the commercial power supply. The GaN semiconductor is suitable for switching at a frequency higher than the audible frequency. In a case where the switching elements 311, 312, 321, and 322 formed of silicon (Si), which is a major semiconductor material, are driven at a switching frequency of several tens kHz or higher, the ratio of the switching loss increases, and a heat radiation measure is essential. In contrast, in the case where the switching elements 311, 312, 321, and 322 are formed of a GaN semiconductor, the switching loss is very small even when the switching elements 311, 312, 321, and 322 are driven at a switching frequency of several tens kHz or higher, or more specifically at a switching frequency higher than 20 kHz. Thus, heat radiation measures become unnecessary, or a heat radiating member used for a heat radiation measure can be reduced in size, and the power converting apparatus 100 can be reduced in size and weight. In addition, when high-frequency switching is enabled, the reactor 2 can be reduced in size. Note that the switching frequency is preferably equal to or lower than 150 kHz so that the primary component of the switching frequency is not included in a range of measurement of noise terminal voltage standard.

In addition, WBG semiconductors are suitable for high-frequency switching because WBG semiconductors have a smaller capacitance than Si semiconductors, a recovery current caused by switching occurs less often, and the occurrence of a loss and noise caused by a recovery current can be reduced.

Note that, because SiC semiconductors have a smaller ON-resistance than GaN semiconductors, the switching elements 311 and 312 of the first arm 31 that is switched more often than the second arm 32 may be formed of GaN semiconductors, and the switching elements 321 and 322 of the second arm 32 that is switched less often may be formed of SiC semiconductors. In this manner, the characteristics of the SiC semiconductors and the characteristics of the GaN semiconductors can be utilized to possible extent. In addition, when the SiC semiconductors are used for the switching elements 321 and 322 of the second arm 32 that is switched less often than the first arm 31, the proportion of conduction loss to the loss of the switching elements 321 and 322 becomes larger, and turn-on loss and turn-off loss become smaller. As a result, an increase in heat generated with switching of the switching elements 321 and 322 is suppressed, the chip area of the switching elements 321 and 322 constituting the second arm 32 can be relatively reduced, and SiC semiconductors with which a chip manufacturing yield is small can be effectively used.

Alternatively, super junction (SJ)-MOSFETs may be used for the switching elements 321 and 322 of the second arm 32 that is switched less often. The use of SJ-MOSFETs can reduce disadvantages SJ-MOSFETs, which are high capacitance and high occurrence of recovery, while making use of low ON-resistance that is an advantage of SJ-MOSFETs. In addition, the use of SJ-MOSFETs can reduce the manufacturing cost of the second arm 32 as compared with use of WBG semiconductors.

In addition, WBG semiconductors have higher heat resistance than Si semiconductors, and can operate even at a high junction temperature. Thus, the use of WBG semiconductors allows the first arm 31 and the second arm 32 to be formed of small chips having a high thermal resistance. In particular, lower cost can be achieved by using SiC semiconductors, with which a chip manufacturing yield is small, for small chips.

In addition, even in a case where WBG semiconductors are driven at a high frequency of about 100 kHz, an increase in a loss generated in the switching elements is reduced or prevented, the loss reduction effect produced by miniaturization of the reactor 2 thus increases, and a highly efficient converter can be achieved in a wide output band, that is, under a wide load condition.

In addition, because WBG semiconductors have a higher heat resistance, and a higher permissible level of heat generation by switching due to imbalance in the loss between arms than Si semiconductors, WBG semiconductors are suitable for the first arm 31 in which a switching loss is produced by high-frequency driving.

Figure 10:
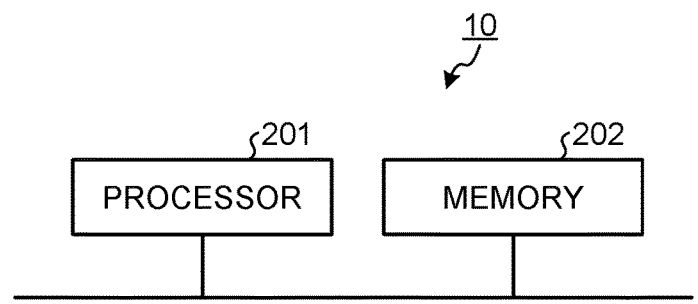
FIG. 10 is a diagram illustrating an example of a hardware configuration for implementing the control unit of the power converting apparatus according to the first embodiment.

Next, a hardware configuration of the control unit 10 of the power converting apparatus 100 will be described. FIG. 10 is a diagram illustrating an example of the hardware configuration for implementing the control unit 10 of the power converting apparatus 100 according to the first embodiment. The control unit 10 is implemented by a processor 201 and a memory 202.

The processor 201 is a central processing unit (CPU; also referred to as a central processing device, a processing device, a computing device, a microprocessor, a microcomputer, a processor, or a digital signal processor (DSP)), or a system large scale integration (LSI). Examples of the memory 202 can include nonvolatile or volatile semiconductor memories such as a random access memory (RAM), a read only memory (ROM), a flash memory, an erasable programmable read only memory (EPROM), and an electrically erasable programmable read only memory (EEPROM: registered trademark). Alternatively, the memory 202 is not limited thereto, and may be a magnetic disk, an optical disk, a compact disk, a mini disc, or a digital versatile disc (DVD).

As described above, according to the present embodiment, in the power converting apparatus 100, when the absolute value of the power-supply current Is is equal to or larger than the first current threshold and equal to or smaller than the second current threshold, the control unit 10 permits a switching element, in which the loss is smaller than that of the parasitic diode within this range, to be ON. In addition, when the absolute value of the power-supply current Is is larger than the second current threshold, the control unit 10 inhibits a switching element, in which the loss is larger than that of the parasitic diode within this range, from being ON. As a result, the power converting apparatus 100 can cause a current to flow through an element with a small loss depending on the current value, thereby reduces or prevents decrease in efficiency, reduces the loss, and can thus achieve a highly efficient system. While the case where two current thresholds are used has been described, this is an example, and the power converting apparatus 100 may perform ON/OFF control on the switching elements by using three or more current thresholds. For example, assume that, in a case where n is an integer equal to or larger than one, the absolute value of an (n+1)-th current threshold is larger than that of an n-th current threshold among the current thresholds. When the power-supply current Is has exceeded or become smaller than a current threshold, the power converting apparatus 100 switches the ON/OFF state of at least one or more of the switching elements.

While the second current threshold is a current value at which the voltage necessary for the current to flow through the parasitic diode and the voltage necessary for the current to flow through the switching element are equal as described above, the second current threshold is not limited thereto. The second current threshold may be a value determined depending on the characteristics of the voltage necessary for the current to flow through the parasitic diode and the characteristics of the voltage necessary for the current to flow through the switching element.

For example, the second current threshold may be a value larger than the current value at which the voltage necessary for the current to flow through the parasitic diode and the voltage necessary for the current to flow through the switching element are equal, depending on a switching loss occurring in the switching element. In this manner, a second current threshold obtained in view of a switching loss that occurs when the switching element is switched from ON to OFF can be determined. In this case, even when the absolute value of the power-supply current Is has further increased in the state in which the switching element is ON, the control unit 10 keeps the switching element in the ON state if the loss is not expected to be reduced by turning the switching element OFF. As a result, the power converting apparatus 100 can further reduce or prevent a decrease in efficiency.

In addition, the second current threshold may be a value obtained by adding or subtracting a preset value from the current value at which the voltage necessary for the current to flow through the parasitic diode and the voltage necessary for the current to flow through the switching element are equal. This enables a second current threshold to be determined in view of differences in characteristics of elements due to variations of components of the elements. In this case, there is a possibility that the control unit 10 cannot improve the loss decrease as compared with the case where the second current threshold is a current value at which the voltage necessary for the current to flow through the parasitic diode and the voltage necessary for the current to flow through the switching element are equal. The control unit 10, however, can reduce the loss further than the case where the switching element is kept in the ON state even when the absolute value of the power-supply current Is has further become larger in the state in which the switching element is ON.

While the control unit 10 controls ON and OFF of the switching elements 321 and 322 depending on the polarity of the power-supply voltage Vs and controls ON and OFF of the switching elements 311 and 312 depending on the polarity of the power-supply current Is in the present embodiment, the control unit 10 is not limited thereto. The control unit 10 may control ON and OFF of the switching elements 311 and 312 depending on the polarity of the power-supply voltage Vs, and control ON and OFF of the switching elements 321 and 322 depending on the polarity of the power-supply current Is.

Second Embodiment

In a second embodiment, a motor driving apparatus including the power converting apparatus 100 described in the first embodiment will be described.

Figure 11:
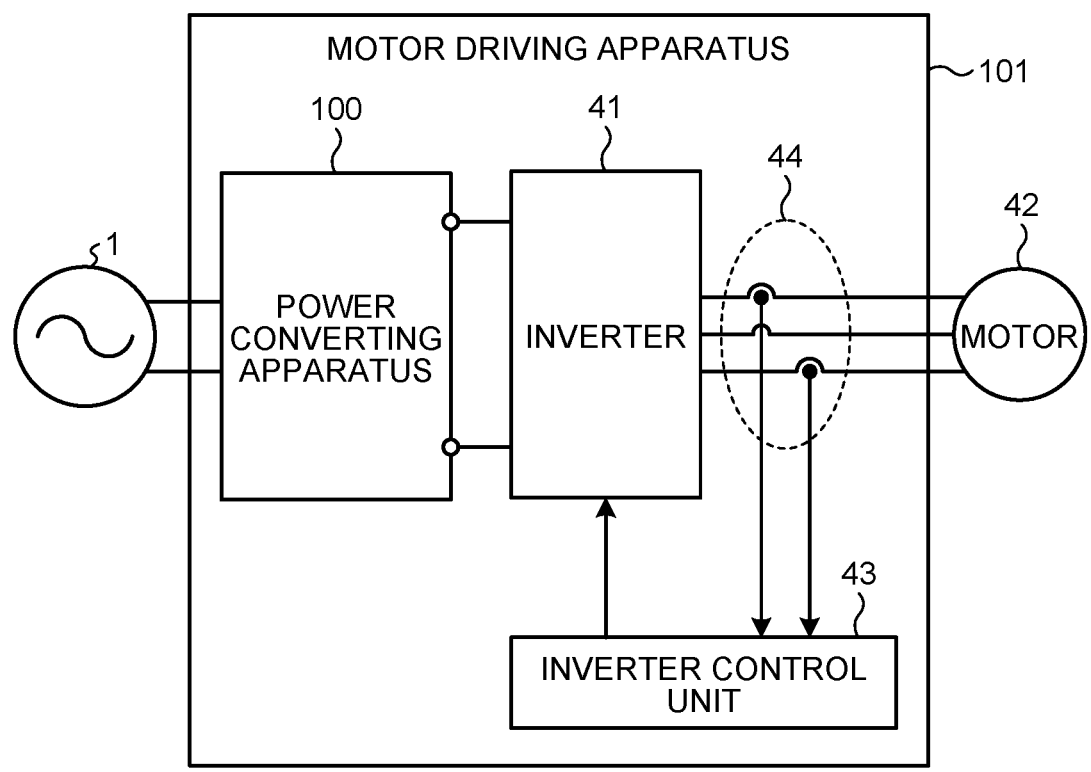
FIG. 11 is a diagram illustrating an example of a configuration of a motor driving apparatus according to a second embodiment.

FIG. 11 is a diagram illustrating an example of a configuration of a motor driving apparatus 101 according to the second embodiment. The motor driving apparatus 101 drives a motor 42 that is a load. The motor driving apparatus 101 includes the power converting apparatus 100 of the first embodiment, an inverter 41, a motor current detecting unit 44, and an inverter controlling unit 43. The inverter 41 drives the motor 42 by converting a direct-current power supplied from the power converting apparatus 100 into an alternating-current power and outputting the alternating-current power to the motor 42. While an example in which the load of the motor driving apparatus 101 is the motor 42 is described, this is an example, and a device connected to the inverter 41 may be any device including a device other than the motor 42, as long as an alternating-current power is input to the device.

The inverter 41 is a circuit that includes switching elements including insulated gate bipolar transistors (IGBTs), in a three-phase bridge configuration or a two-phase bridge configuration. The switching elements included in the inverter 41 are not limited to IGBTs, but may be switching elements made of WBG semiconductors, integrated gate commutated thyristors (IGCTs), field effect transistors (FETs), or MOSFETs.

The motor current detecting unit 44 detects currents flowing between the inverter 41 and the motor 42. The inverter controlling unit 43 generates PWM signals for driving the switching elements in the inverter 41 by using the currents detected by the motor current detecting unit 44 so that the motor 42 rotates at a desired rotating speed, and applies the PWM signals to the inverter 41. The inverter controlling unit 43 is implemented by a processor and a memory in a manner similar to the control unit 10. Note that the inverter controlling unit 43 of the motor driving apparatus 101 and the control unit 10 of the power converting apparatus 100 may be implemented by one circuit.

In a case where the power converting apparatus 100 is used in the motor driving apparatus 101, the bus voltage Vdc necessary for controlling the bridge circuit 3 changes depending on the operation state of the motor 42. Typically, as the rotating speed of the motor 42 is higher, the voltage output from the inverter 41 needs to be higher. The upper limit of the voltage output from the inverter 41 is limited by a voltage input to the inverter 41, that is, the bus voltage Vdc that is output from the power converting apparatus 100. A region in which the voltage output from the inverter 41 exceeds the upper limit that is limited by the bus voltage Vdc and is saturated is called an overmodulation region.

In the motor driving apparatus 101 as described above, the bus voltage Vdc need not be increased if the motor 42 operates in a low rotation range, that is, in a range in which the overmodulation region is not reached. In contrast, when the motor 42 rotates at high speed, the overmodulation region can be shifted toward higher rotation by increasing the bus voltage Vdc. As a result, the operation range of the motor 42 can be expanded toward higher rotation.

In addition, when the operation range of the motor 42 need not be expanded, the number of coil turns around a stator of the motor 42 can be increased by a corresponding amount. In the low rotation region, the increase in the number of coil turns makes the motor voltage generated across the coil ends higher, and lowers the current flowing in the coil accordingly, thereby reduces the loss caused by the switching operations of the switching elements in the inverter 41. For producing both effects of expansion of the operation range of the motor 42 and improvement in the loss in the low rotation region, the number of coil turns of the motor 42 is set to an appropriate value.

As described above, according to the present embodiment, the use of the power converting apparatus 100 enables the motor driving apparatus 101 with reduced imbalance in heat generation between the arms, high reliability, and high power to be achieved.

Third Embodiment

In a third embodiment, an air conditioner including the motor driving apparatus 101 described in the second embodiment will be described.

Figure 12:
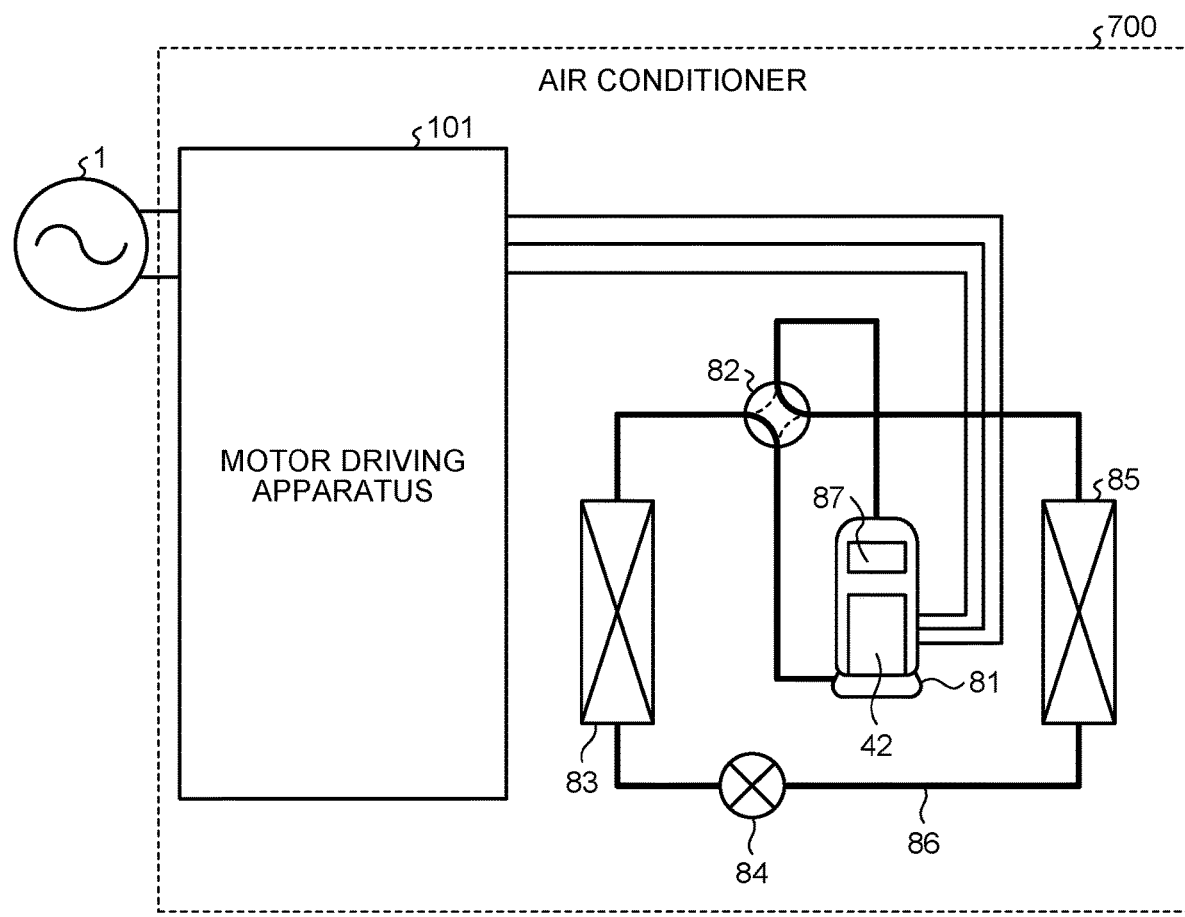
FIG. 12 is a diagram illustrating an example of a configuration of an air conditioner according to a third embodiment.

FIG. 12 is a diagram illustrating an example of a configuration of an air conditioner 700 according to the third embodiment. An air conditioner 700 is an example of a refrigeration cycle system, and includes the motor driving apparatus 101 and the motor 42 according to the second embodiment. The air conditioner 700 includes a compressor 81 including a compression mechanism 87 and the motor 42, a four-way valve 82, an external heat exchanger 83, an expansion valve 84, an internal heat exchanger 85, and refrigerant piping 86. The air conditioner 700 is not limited to a split air conditioner in which an outdoor unit is separated from an indoor unit, and may be an integrated air conditioner in which the compressor 81, the internal heat exchanger 85, and the external heat exchanger 83 are installed in one housing. The motor 42 is driven by the motor driving apparatus 101.

The compressor 81 includes therein the compression mechanism 87 for compressing the refrigerant, and the motor 42 for causing the compression mechanism 87 to operate. A refrigeration cycle is constituted by circulation of refrigerant through the compressor 81, the four-way valve 82, the external heat exchanger 83, the expansion valve 84, the internal heat exchanger 85, and the refrigerant piping 86. Note that the components of the air conditioner 700 can also be applied to such equipment as a refrigerator or a freezer including a refrigeration cycle.

In addition, in the third embodiment, an example of a configuration in which the motor 42 is used as a driving source of the compressor 81 and the motor 42 is driven by the motor driving apparatus 101 is described. The motor 42, however, may be applied to a driving source for driving an indoor unit fan and an outdoor unit fan, which are not illustrated, included in the air conditioner 700, and the motor 42 may be driven by the motor driving apparatus 101. Alternatively, the motor 42 may be applied to driving sources of the indoor unit fan, the outdoor unit fan, and the compressor 81, and the motor 42 may be driven by the motor driving apparatus 101.

In addition, because the operation of the air conditioner 700 is dominantly performed under an intermediate condition in which the power output is equal to or lower than half of a rated power output, that is, under a low power condition throughout the year, the contribution to the annual power consumption under the intermediate condition is high. In addition, in the air conditioner 700, the rotating speed of the motor 42 tends to be low, and the bus voltage Vdc required for driving the motor 42 tends to be low. Thus, operation of the switching elements used in the air conditioner 700 in a passive state is effective in terms of system efficiency. The power converting apparatus 100 capable of reducing the loss in a wide range of operation modes from the passive state to the high-frequency switching state, is therefore useful for the air conditioner 700. Although the reactor 2 can be reduced in size according to the interleaving method as described above, the frequency of operation of the air conditioner 700 under the intermediate condition is high, and thus the reactor 2 need not be reduced in size; rather, the configurations and operations of the power converting apparatus 100 are more effective in terms of harmonic wave reduction or prevention and the power-supply power factor.

In addition, because the power converting apparatus 100 can reduce the switching loss, an increase in the temperature of the power converting apparatus 100 is reduced, and the capacity of cooling a board mounted on the power converting apparatus 100 can be ensured even when the outdoor unit fan, which is not illustrated, is reduced in size. The power converting apparatus 100 is therefore suitable for use in the air conditioner 700 that is highly efficient and has a high power equal to or higher than 4.0 kW.

In addition, according to the present embodiment, the use of the power converting apparatus 100 reduces the imbalance in heat generation between the arms, which enables the reactor 2 to be reduced in size by virtue of high-frequency driving of the switching elements, and can reduce or prevent an increase in weight of the air conditioner 700. In addition, according to the present embodiment, high-frequency driving of the switching elements reduces the switching loss, and the air conditioner 700 with a low energy consumption rate and high efficiency can thus be achieved.

The configurations presented in the embodiments above are examples of the present invention, and can be combined with other known technologies or can be partly omitted or modified without departing from the scope of the present invention.

REFERENCE SIGNS LIST 1 alternating-current power supply; 2 reactor; bridge circuit; 4 smoothing capacitor; 5 power-supply voltage detecting unit; 6 power-supply current detecting unit; 7 bus voltage detecting unit; 10 control unit; 31 first arm; 32 second arm; 41 inverter; 42 motor; 43 inverter controlling unit; 44 motor current detecting unit; 50 load; 81 compressor; 82 four-way valve; 83 external heat exchanger; 84 expansion valve; 85 internal heat exchanger; 86 refrigerant piping; 87 compression mechanism; 100 power converting apparatus; 101 motor driving apparatus; 201 processor; 202 memory; 311, 312, 321, 322 switching element; 311a, 312a, 321a, 322a parasitic diode; 501 first line; 502 second line; 503 third line; 504 fourth line; 506 first connection point; 508 second connection point; 600 semiconductor substrate; 601, 603 region; 602 insulating oxide layer; 604 channel; 700 air conditioner.

The invention claimed is:

1. A power converting apparatus comprising:
a reactor including a first terminal and a second terminal, the first terminal being connected to an alternating-current power supply;
a bridge circuit connected to the second terminal of the reactor and including at least one or more switching elements, the bridge circuit converting an alternating-current voltage output from the alternating-current power supply into a direct-current voltage;
a current detector detecting a current from the alternating-current power supply;
a processor; and
a memory storing a program which, when executed by the processor, performs processes of:
controlling ON and OFF of the switching elements depending on a current value detected by the current detector, wherein
the power converting apparatus includes two or more current thresholds for controlling ON and OFF of the switching elements,
when an absolute value of the current value is equal to or larger than a first current threshold and equal to or smaller than a second current threshold, at least one or more of the switching elements is turned ON depending on a polarity of the current value, and
when the absolute value of the current value is smaller than the first current threshold or larger than the second current threshold, at least one or more of the switching elements is turned OFF.

2. The power converting apparatus according to claim 1, wherein the second current threshold is a value determined depending on characteristics of a voltage necessary for a current to flow through diodes connected in parallel with the switching elements and characteristics of a voltage necessary for a current to flow through the switching elements.

3. A motor driving apparatus for driving a motor, the motor driving apparatus comprising:
the power converting apparatus according to claim 2;
an inverter converting a direct-current power output from the power converting apparatus into an alternating-current power, and outputting the alternating-current power to the motor.

4. An air conditioner comprising:
a motor; and
the motor driving apparatus according to claim 3.

5. A motor driving apparatus for driving a motor, the motor driving apparatus comprising:
the power converting apparatus according to claim 1;
an inverter converting a direct-current power output from the power converting apparatus into an alternating-current power, and outputting the alternating-current power to the motor.

6. An air conditioner comprising:
a motor; and
the motor driving apparatus according to claim 5.

* * * * *